United States Patent [19]
Campbell et al.

[11] Patent Number: 5,520,058
[45] Date of Patent: May 28, 1996

[54] MAGNETIC RELUCTANCE FLOWMETER

[75] Inventors: Peter Campbell, Boca Raton, Fla.; Robert A. Seto, Crystal Lake; Alex G. Bersin, Long Grove, both of Ill.

[73] Assignee: Cole-Parmer Instrument Company, Niles, Ill.

[21] Appl. No.: 417,106

[22] Filed: Apr. 5, 1995

[51] Int. Cl.$^6$ .................................................. G01F 1/56
[52] U.S. Cl. ................................... 73/861.08; 73/239
[58] Field of Search ........................... 73/861.08, 861.05, 73/861.18, 239, 861.71; 222/59, 159

[56] References Cited

U.S. PATENT DOCUMENTS

| | | | |
|---|---|---|---|
| 3,344,667 | 10/1964 | Maltby | 73/239 |
| 3,611,220 | 10/1971 | Hoffman | 335/207 |
| 3,683,691 | 8/1972 | Kivenson | 73/194 B |
| 4,003,255 | 1/1977 | Spencer | 73/861.71 |
| 4,081,635 | 3/1978 | Moore | 220/81.9 M |
| 4,101,874 | 7/1978 | Denison et al. | 340/606 |
| 4,227,409 | 10/1980 | Bingler | 73/861.71 |
| 4,240,291 | 12/1980 | Andersson et al. | 73/861.05 |
| 4,475,407 | 10/1984 | Kruncos | 73/861.53 |
| 4,507,062 | 3/1985 | Wally | 417/413 |
| 4,523,902 | 6/1985 | Wally | 417/410 |
| 4,537,565 | 8/1985 | Elder | 417/413 |
| 4,547,680 | 10/1985 | Edler | 307/141 |
| 4,592,741 | 6/1986 | Vincent | 604/35 |
| 4,629,987 | 12/1986 | King et al. | 73/861.05 |
| 4,694,161 | 9/1987 | Sackett | 250/231 R |
| 4,858,647 | 8/1989 | Custer | 137/599.1 |
| 4,944,190 | 7/1990 | Scally et al. | 73/861.58 |
| 4,947,153 | 8/1990 | Berger | 340/608 |
| 4,963,857 | 10/1990 | Sackett | 340/606 |
| 5,214,964 | 6/1993 | Hartfiel | 73/861 |
| 5,343,085 | 8/1994 | Fujimoro et al. | 307/272.3 |
| 5,392,648 | 2/1995 | Robertson | 73/239 |

FOREIGN PATENT DOCUMENTS

| | | |
|---|---|---|
| 2950420A1 | 6/1981 | Germany. |
| 3411156A1 | 10/1985 | Germany. |
| 3505706A1 | 8/1986 | Germany. |
| 3512426A1 | 11/1986 | Germany. |
| 3941981A1 | 6/1991 | Germany. |

OTHER PUBLICATIONS

"Flow Measurement Under Any Condition–It's Not Impossible!", by Leonard Blasso, Department Editor, taken from *Instruments & Control Systems*, pp. 45–50, Feb., 1975.

"Magmeters Tackle The Tough Tasks," taken from *Special Report—Flow–Monitoring, I&CS*, Feb., 1992, pp. 23–24.

"Prove It for Yourself—Accurate Should be More Than Just a Name," taken from *American Laboratory (Humonics Inc.),* p. 281. (Undated advertisement).

"For Precise Gas Flow Measurement—Meriam Laminar Flow Elements Offer Extremely Accurate Performance," advertisement taken from *Meriam Instrument*, Cleveland, Ohio, p. 12. (Undated advertisement).

"We Don't Do Windows or Liquid Flow Measurements—CME Only Makes The Best Gas Flowmeters On The Market," advertisement taken from *CME/Division Of Aerospace Control Products, Inc.*, p. 22. (undated advertisement).

"Choices Flow—As Flowmeter Choices Widen, So Do The Problems Of Selecting The Most Suitable One," by Donald Ginesi, taken from *Chemical Engineering*, Apr., 1991, pp. 88–100.

"Consider The Attractions of Magnetic Flowmeters," by Charlie Rose and Gabor E. Vass, taken from *Chemical Engineering Progress*, Dec., 1993, pp. 61–65.

"Find The Hidden Errors," by R. Michael Bell, taken from *Engineering Practice—Chemical Engineering*, May, 1992, pp. 128–133.

*Primary Examiner*—Richard Chilcot
*Assistant Examiner*—Elizabeth L. Dougherty
*Attorney, Agent, or Firm*—Fitch, Even, Tabin & Flannery

[57] ABSTRACT

A magnetic reluctance flowmeter having a magnetic float in which a permanent magnet and soft iron pole pieces are arranged in such a manner that the resulting magnetic field passes directly through the yoke which is also made of soft iron. The shape of the yoke is such that, as the magnetic float is progressively displaced from its neutral position within the yoke, the magnetic field progressively saturates regions of the yoke causing some of this field to emanate into the space surrounding the yoke, in which locations this emanating field interacts with the magnetic field sensors in such a way as to modify the electrical signal produced by a sensing circuit.

26 Claims, 5 Drawing Sheets

MAGNETIC RELUCTANCE FLOWMETER

BACKGROUND OF THE INVENTION

1. Field of the Invention

The present invention relates generally to a magnetic reluctance flowmeter for measuring the rate of flow of gasses or liquids, and relates more particularly to a magnetic reluctance flowmeter having a magnetic float within the flow stream and a yoke outside the flow stream, wherein the yoke is positioned relative to an electronic circuit having magnetic field sensors arranged to produce a signal which is related directly to the displacement of the magnetic float caused by the flow of the stream.

2. Description of the Related Art

The rate of flow of gasses or liquids flowing in a pipe can be measured by installing a partial obstruction in the pipe to create a differential pressure. Pressure is directly related to the square of the flow velocity according to the well known Bernoulli's Equation, and thus the difference in pressure before and at the obstruction can be used as a measure of the flow velocity. Because the differential pressure depends upon the geometry of the obstruction, the range of flow velocity that can be measured with such a device is limited, and this inhibits its ability to measure low flow velocities to within a reasonable accuracy of 1% or less. Measured pressures at the installed partial obstruction may be also adversely affected by particles within fluids and/or diameter changes or angled portions of installed pipe sections. Additionally, since it is desirable to provide a signal which is linearly related to the flow velocity, and because this method is based upon the non-linear relationship between flow and pressure, a secondary measuring system is required to convert pressure into the desired linear signal.

A direct linear measurement of the rate of flow of gasses or liquids flowing in a pipe is achieved by installing a turbine rotor in the pipe. The speed of rotation of the rotor is measured by an appropriate sensor mounted adjacent to the rotor and outside the pipe, such that each blade of the rotor induces a signal pulse in the sensor and the rate of these pulses is interpreted to give a linear measurement of the flow over moderate to high velocities. The range of flow velocity that can be measured with such a linear device is around 10:1. A limitation of this method is that the turbine rotor is mounted in bearings, the friction in which causes the relationship between flow velocity and rotor speed to become non-linear at low flow velocities.

A linear measurement of the rate of flow of gasses or liquids flowing in a pipe is provided by a float which travels up and down a short vertical section of pipe having a tapered bore of variable area. In the art, such apparatus are commonly referred to as rotometers. The pressure on the float caused by a progressively increasing flow passing upwards in the pipe causes the float to rise progressively into pipe sections of greater cross-sectional area, thence to settle in a position where this pressure is in equilibrium with the gravitational force acting on the float. If the section of pipe is transparent and the fluid is not opaque, the height to which the float rises is proportionally related to the flow velocity, but this is a visual measurement which can only be translated into a signal with extreme difficulty. However, the range of flow velocity that can be measured with such a linear device is again around 10:1, and this facilitates the measurement of low flow velocities to within a reasonable accuracy of 1% or less.

While there are many other complex devices for measurement of the rate of flow of gasses and liquids in pipes, an advantage of the aforementioned float method is its simple construction with a single moving component (the float) in the flow stream. Attempts to alleviate the one significant disadvantage of the float method, that it is essentially a visual measurement method, have resulted in the use of permanent magnets as the float. German Laid-Open Patent Numbers DE 3,411,156 and DE 3,505,706 disclose a magnetic field resulting from a permanent magnet float will exist outside the pipe, where it may interact with a magnetic field sensor (or sensors) which operates in conjunction with an electronic circuit. Clearly the movement of the permanent magnet float within the flow stream must be constrained within a limited linear distance, and as the float is displaced by the flow, the resulting magnetic field will modify the signal produced by the electronic circuit. Thus, an electrical signal is produced which is related to the flow velocity. However, by not constraining the resulting magnetic field in a well defined magnetic circuit, the magnitude of the field at the sensor for any fixed position and orientation of the sensor will vary in a highly non-linear manner with the flow velocity, and it may be influenced by any other magnetic components surrounding the device. Consequently, by using a permanent magnet float as described in the prior art, the advantage of producing an electrical signal as a function of flow velocity is accompanied by the disadvantage that this function is now non-linear and somewhat unpredictable.

SUMMARY OF THE INVENTION

Accordingly, it is an object of the present invention to overcome the problems and disadvantages of prior art flowmeters.

It is an object of the invention to provide a flowmeter producing a substantially linear measurement of fluid flow velocities.

It is an object of the invention to produce an electrical signal substantially linearly related to flow velocity.

It is an object of the invention to provide a magnetic reluctance flowmeter for measuring the rate of fluid flow of gasses or liquids comprising a magnetic float within the flow stream and a yoke outside the flow stream wherein the float incorporates a permanent magnet and soft iron pole pieces and the yoke is made from soft iron, and these components are arranged in such a manner that the resulting magnetic field is substantially constrained to pass directly through the yoke so that it is not significantly influenced by any other magnetic components surrounding the device.

It is a further object of this invention to provide a magnetic reluctance flowmeter having a magnetic float within the flow stream and a yoke outside the flow stream wherein the shape of the yoke is such that, as the magnetic float is progressively displaced from its neutral position within the yoke, the magnetic field progressively saturates the regions of the yoke causing some of this field to emanate into the space immediately surrounding the yoke in which region there can be identified locations at which the magnitude of this field in a given direction maintains an approximately linear relationship with the flow velocity.

It is an additional object of this invention to provide a magnetic reluctance flowmeter having a yoke that carries thereon an electronic circuit with magnetic field sensors arranged in the aforementioned locations, this electronic circuit combining the signals from the sensors in such a way as to produce an output signal which is related to the velocity of the flow that is displacing the magnetic float, which may also include displacement of the float in either direction by flow in either direction.

It is another object of this invention to provide a magnetic reluctance flowmeter for measuring the rate of flow of gasses or liquids in a short section of pipe by utilizing a magnetic float within the pipe and a yoke surrounding the pipe that carries an electronic circuit providing an output signal which is related to the velocity of the flow, which relationship is not dependent upon physical orientation or upstream conditioning for the flowmeter.

Other objects of the present invention, as well as particular features, elements, and advantages thereof, will be elucidated in, or apparent from, the following description and the accompanying drawing figures.

The present invention provides a magnetic reluctance flowmeter and a method for measuring axial fluid flow in which a magnetic float within a flow stream is displaceable thereby with the float residing coaxially with the fluid flow for generating a magnetic field thereabout. A ferromagnetic yoke outside the flow stream substantially constrains the magnetic field to pass directly therethrough when the float is in a neutral position relative to the yoke. The yoke thus resides on a non-magnetic flow pipe allowing the magnetic field of the float to pass through the yoke. A magnetic field sensor adjacent the yoke senses any magnetic field emanating from the yoke when the float is displaced from the neutral position allowing the magnetic field to saturate a region of the yoke. An electronic circuit connected to the magnetic field sensor of the magnetic reluctance flowmeter produces an output signal which is related to fluid flow displacing the float.

Briefly summarized, the present invention relates to a magnetic float having a permanent magnetic and soft iron pole pieces which are arranged in a manner such that the resulting magnetic field passes directly through the yoke which is also made of soft iron. The shape of the yoke is such that as the magnetic float is progressively displaced from its neutral position within the yoke, the magnetic field progressively saturates regions of the yoke causing some of this field to emanate into the space surrounding the yoke, in which locations the emanating field interacts with the magnetic field sensors in such a way as to modify the electrical signal produced by a sensing circuit.

DETAILED DESCRIPTION OF THE PREFERRED EMBODIMENT

Figure 1A:
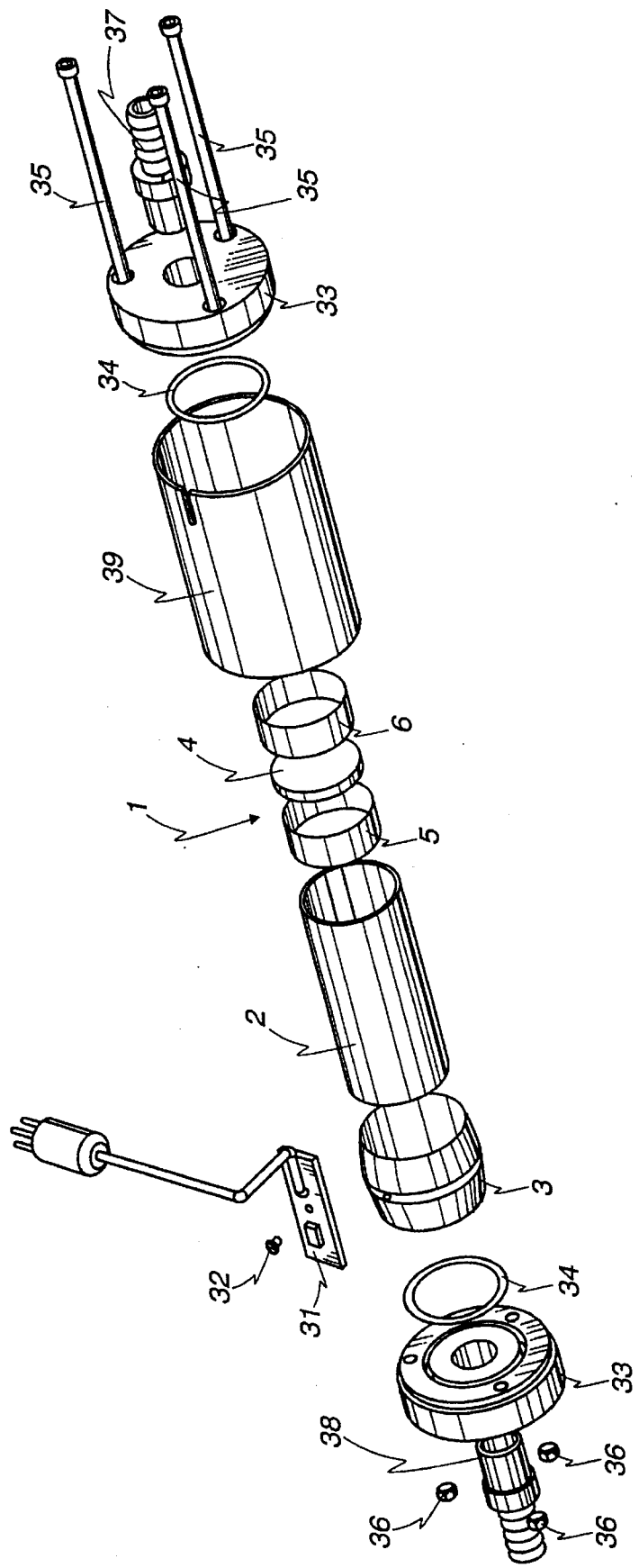
FIG. 1A is an exploded perspective view of a magnetic reluctance flowmeter in accordance with the present invention.
Figure 1B:
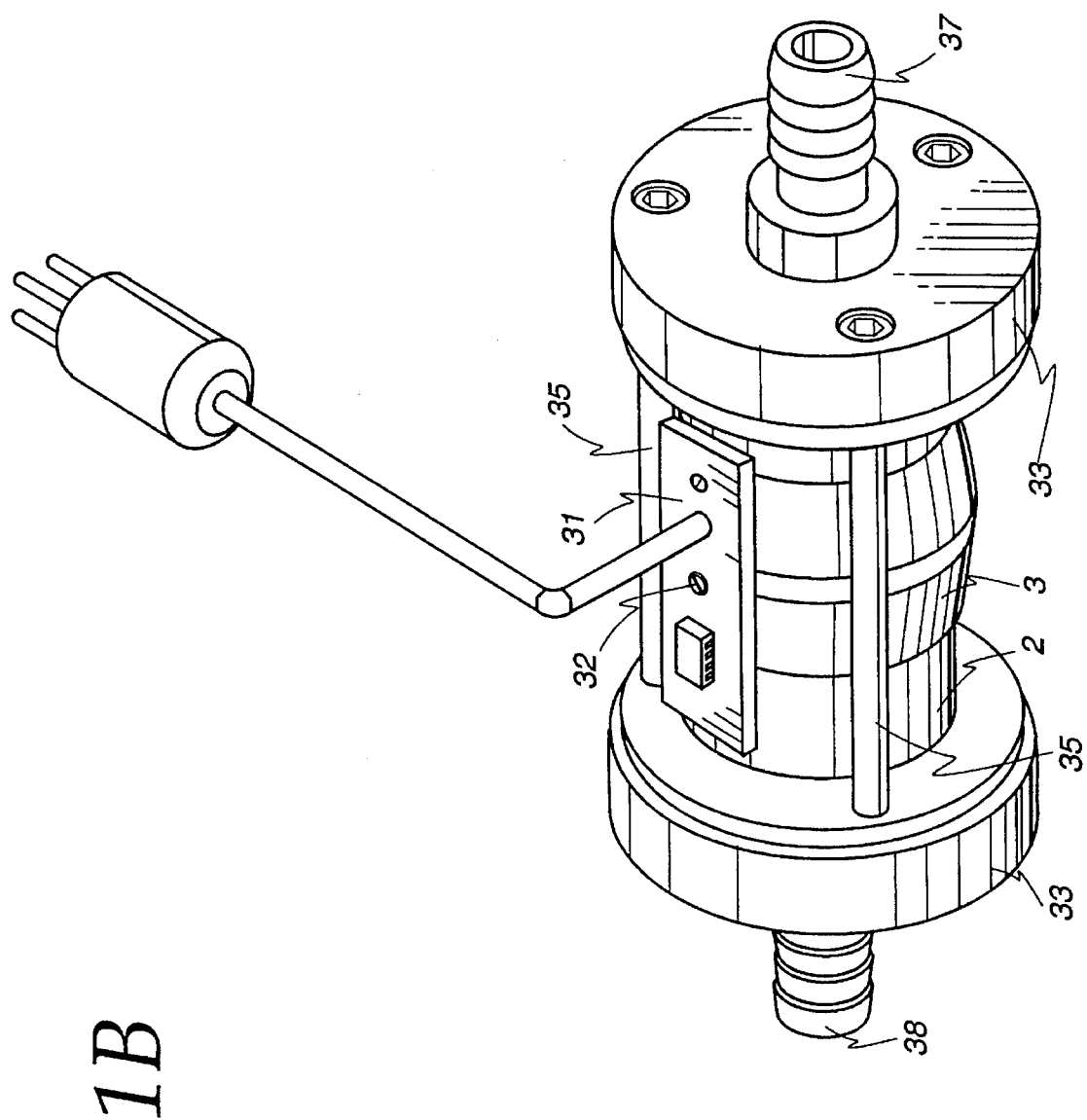
FIG. 1B is a perspective view of the magnetic reluctance flowmeter assembly opened without an outer housing to show the yoke outside the flow stream carrying an electronic circuit for sensing magnetic fields thereon.
Figure 1C:
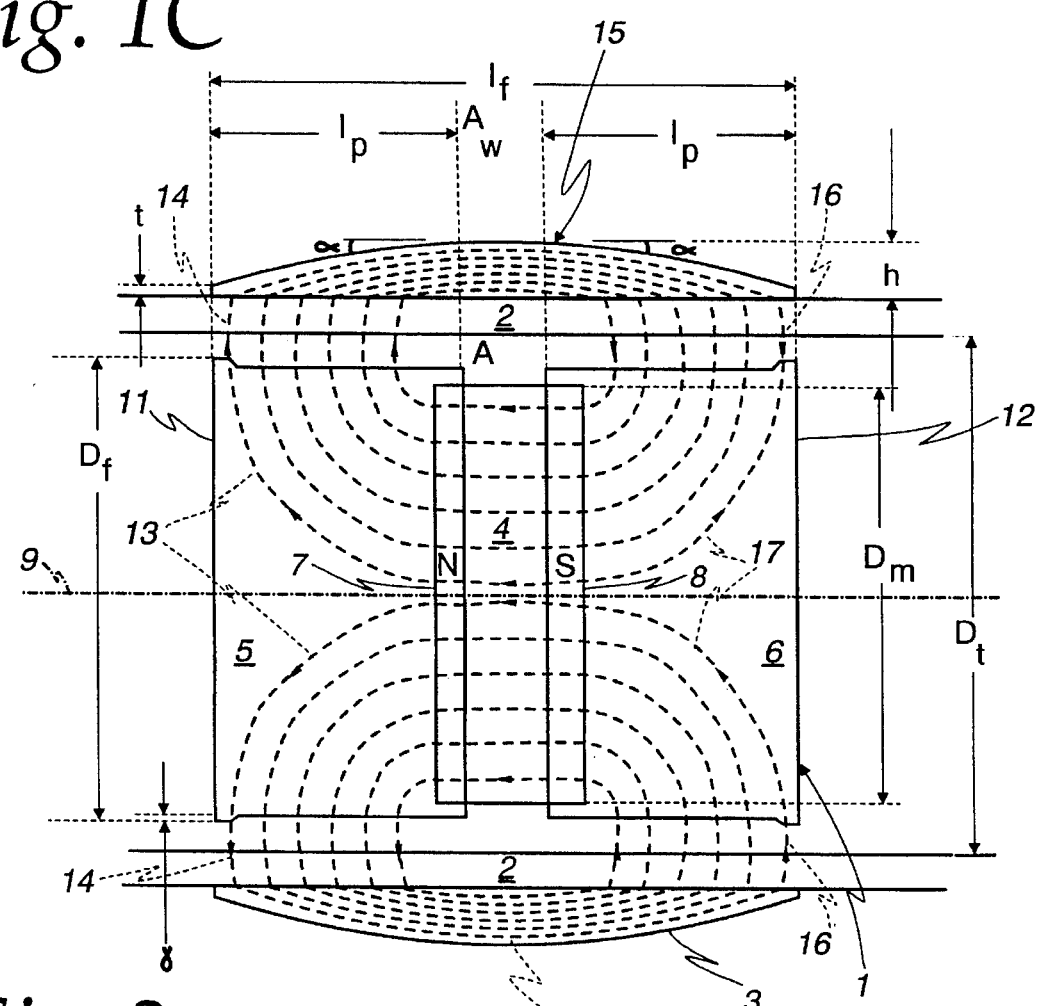
FIG. 1C is a cross-sectional view showing a magnetic float in a non-magnetic pipe and a soft iron yoke.

FIGS. 1A–1C show views of an embodiment of the invention described herein. A magnetic float generally indicated by reference numeral 1 is provided for insertion in a non-magnetic flow pipe 2 having a ferromagnetic yoke 3 thereon positioned over the magnetic float 1 upon its insertion into the flow pipe 2. The magnetic float 1 includes a disk-shaped permanent magnet 4 and end pieces 5 and 6, as discussed in detail below in connection with FIG. 1C.

FIG. 1A shows an exploded view of the embodiment of the magnetic reluctance flowmeter illustrating its assembly, and FIG. 1B shows the assembled embodiment of the flowmeter in perspective. A printed circuit board assembly having magnetic field sensors, electronic circuitry and cabling is indicated by reference numeral 31 for placement adjacent the yoke 3 with a screw 32. The placement of one or more magnetic field sensors and the electronic circuit of assembly 31 carried upon the yoke 3 provides a magnetic field sensor adjacent the yoke 3 for sensing any magnetic field emanating from the yoke 3 when the float 1 is displaced from a neutral position allowing the magnetic field to saturate a region of the yoke 3, and the electronic circuit connected to the magnetic field sensor produces an output signal which is related to the fluid flow displacing the float 1.

End caps 33 are provided for use with O-rings 34 for securement of the flow tube 2 with bolts 35 and nuts 36 extending between the end caps 33. Tubing connectors 37 and 38 are respectively provided as input and output connectors allowing for the introduction of a flow stream allowing axial fluid flow therethrough. Thus, the magnetic float 1 within such flow stream of a gas or liquid is displaceable thereby with the float residing coaxially with the fluid flow for generating a magnetic field thereabout. The yoke 3 thus outside the flow stream substantially constrains the magnetic field to pass directly through the yoke 3 when the float 1 is in its neutral position relative to the yoke 3 as illustrated by FIG. 1C. An outer housing 39 is provided for enclosing the magnetic reluctance flowmeter. The view of FIG. 1B shows the outer housing 39 removed to expose the assembled flowmeter therein including a magnetic flow transducer for measuring axial fluid flow as described.

When the method of measuring the rate of flow in a pipe involves using a float of density $\rho_f$ which travels along a short section of that pipe, the velocity of the liquid or gas of density $\rho$, expressed as the volumetric flow rate q, will be opposed by several components of force acting upon the float to constrain its displacement to within that short section. Among these are forces $F_f$ due to the weight and buoyancy of the float itself, and the magnetic force $F_m$ in the case of a magnetic float producing a magnetic field which is interacting with a stationary yoke surrounding the pipe. If the float is a solid cylinder of length $l_f$ and diameter $D_f$ which moves coaxially within the pipe whose bore diameter is $D_p$, and the magnetic force $F_m$ is expressed as the pressure $P_m$ it exerts on the cross-sectional area $\pi D_f^2/4$ of the cylinder, then the flow rate due to the forces $F_f$ and $F_m$ may be expressed as:

$$q \propto (D_t^2 - D_f^2) \sqrt{\frac{P_m}{\rho} + l_f \frac{\rho_f - \rho}{\rho}} \qquad (1)$$

The first term ($P_m/\rho$) represents the contribution of $F_m$ while the second term represents that of $F_f$. It is therefore apparent from Equation (1) that, for the measurement of flow rate to be approximately independent of the physical orientation of the magnetic reluctance flowmeter, a requirement is for $P_m$ to be substantially greater in magnitude than $l_f (\rho_f-\rho)$. This is achieved in part by incorporating into the float a grade of permanent magnet material which has a very high energy density, that will produce a high magnetic field, which facilitates a high value for $P_m$, while maintaining a high magnetizing force, which allows a short magnet length component of $l_f$. Suitable permanent magnetic materials may include the "rare earth" grades, such as samarium-cobalt and neodymium-iron-boron.

When the method of measuring the rate of flow in a pipe involves passing the liquid or gas through a gap of relatively small cross-sectional area, as between the diameters $D_t$ and $D_f$, there will also be a pressure drop $\Delta P_d$ along the length $l_f$ of the gap which represents an error in the value of $P_m$, which is used to determine the flow rate q in the magnetic reluctance flowmeter. This pressure drop may be expressed as:

$$\Delta P_d \propto q \frac{l_f}{(D_t - D_f)^3 (D_t + D_f)} \qquad (2)$$

For the measurement of flow rate to be reasonably unaffected by pressure drop through the gap, $\Delta P_d$ must be very small compared to $P_m$, for which it is apparent from Equation (2) that the difference $(D_t-D_f)$ should not be very small. This may be achieved by incorporating into the float a "rare earth" permanent magnet material that has a very high energy density, with a high magnetizing force which may sustain a high magnetic field through a longer gap, a component of which is $(D_t-D_f)$.

FIG. 1C shows components of the magnetic reluctance flowmeter including the cylindrical magnetic float 1, the non-magnetic pipe 2 and the cylindrical soft iron yoke 3. The yoke 3 is permanently attached to the pipe 2 such as by bonding together, which assembly is coaxial with the float 1. The float 1 comprises the disk-shaped permanent magnet 4 whose magnetic orientation is in the axial direction, which is sandwiched between the two identical soft iron pole pieces 5 and 6. The pole pieces 5 and 6 are permanently attached to the planar North and South pole faces 7 and 8 respectively of the magnet 4 such as by bonding together, thus forming the complete magnetic float assembly 1. When there is no flow stream in the pipe, e.g., when the gas or liquid has zero velocity, the magnetic float 1 will rest in its neutral position as depicted in FIG. 1C, in which position the length $l_f$ of the float is coincident with the length $l_f$ of the yoke. When there exists a flow stream in the pipe, the gas or liquid must pass through the gap between the outer diameter $D_f$ of the float and the inner diameter $D_t$ of the pipe, and this flow causes the magnetic float 1 to move coaxially within the stationary pipe 2 along its axis 9. This linear displacement of the float 1 is constrained by the magnetic forces to a limited distance either side of its neutral position, the direction of movement being determined by the direction of the flow.

Figure 2:
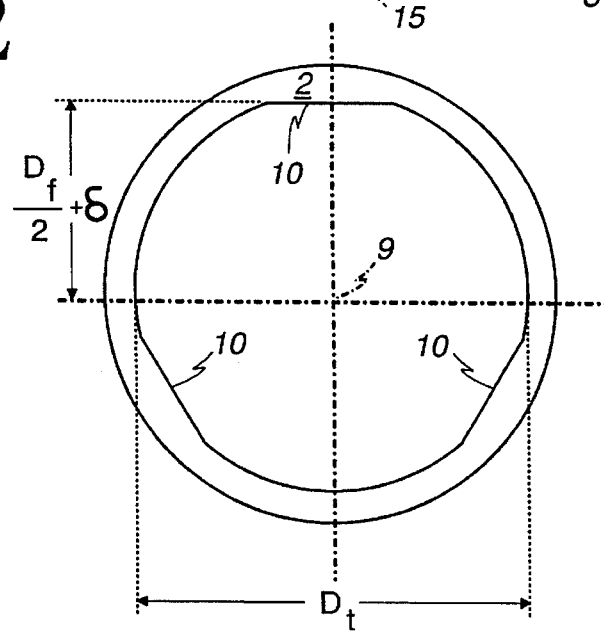
FIG. 2 is a cross-sectional view of the non-magnetic pipe of FIGS. 1A–1C.

The typical cross-section of the pipe 2 in FIG. 2 shows that, within the inner pipe diameter $D_t$, there exist three (3) flat surfaces 10 (flats 10) which are coplanar with the axis 9, which are equi-spaced at 120° intervals around the inner circumference of the pipe 2. Each of the surfaces 10 are at a distance ($\frac{1}{2}D_f+\delta$) from the axis, where $\delta$ is a very small clearance around the float diameter $D_f$, which is required to provide physical support at the outer ends 11 and 12 of the pole pieces 5 and 6 respectively while allowing axial movement for the float assembly 1. A suitable value for $\delta$ will be approximately 0.0025 inches. Therefore, the cross-sectional profile of the pipe 2 shown in FIG. 2 is constant over the entire distance of travel of either of the outer ends 11 and 12 of the float 1. The outer ends 11 and 12 have extending end-bearing ridges for contact with the flats 10 allowing flow with a larger gap and lower pressure drop. Additionally, minimal contact between the flats 10 and outer ends 11 and 12 provides four points of contact of six potential contact points between the two outer ends and the three flats to minimize frictional effects.

The pipe 2 may be made from any suitable non-magnetic material, although glass has been found to provide good resistance to a wide range of corrosive liquids whose flow rates might need to be measured. Aluminum may also provide a suitable non-magnetic pipe 2. The pipe 2 of the embodiment is made of borosilicate glass formed upon a stainless steel mandrel having the three flats 10 machined thereon allowing heated glass tubing provided in a vacuum to shrink the glass to the mandrel, thus allowing the glass to shape to the stainless steel with a tight fit. As the glass and stainless steel mandrel are cooled, the glass hardens and the mandrel shrinks allowing for the removal of the pipe 2 from the stainless steel mandrel. The pipe 2 is then precision-ground on the outside so any gap between the pipe 2 and the yoke 3 is minimized, typically on the order of 0.060 inches. The internal profile of the pipe may resume any convenient sectional shape beyond the limits of travel of the float, and the section of pipe 2 may be mated to these adjoining pipe sections using any convenient seal against leakage of the flow stream through the pipe, such as the O-ring seals 34.

To minimize the contact area and hence the friction between the magnetic float 1 and the pipe 2, FIG. 1C also shows that only a very narrow annulus at each outer end 11 and 12 of the float 1 extends out to the diameter $D_f$, and that most of the annular surfaces of the pole pieces 5 and 6 are at a radius that is less than $D_f$ by a small distance $\gamma$, where 65 need only be approximately 0.010 inches. Neither is the annular surface of the permanent magnet 4 in contact with the pipe 2, because its diameter $D_m$ is smaller than $D_f-2\gamma$ such that its planar faces 7 and 8 are slightly recessed within the inner ends of the pole pieces 5 and 6 respectively. When $\delta$ is around 0.010 inches, a suitable value for $(D_f-D_m)$ would be approximately 0.060 inches.

To provide protection to the magnet and soft iron from the corrosive effects of certain liquids, the exterior surfaces of the magnetic float 1 should receive a very thin, uniform coating of a suitable material such as PTFE (polytetrafluoroethylene) or TEFLON™, in which case the diameter $D_f$ is used herein will include this coating thickness. Any suitable coating to prevent corrosion of the float 1 in the presence of chemical fluid will suffice and may also include nickel plating and/or epoxy materials for encasing the float 1. Where the float 1 is encased with a material such as epoxy or the like, the encasing may also provide means for positioning the float within the flow stream such as ribbing or protruding portions on the encasing material itself.

The disk-shaped permanent magnet 4 is preferably a "rare earth" grade material, such as samarium-cobalt or neodymium-iron-boron, which should be anisotropic with its magnetic orientation along the axis 9. FIG. 1C shows that the magnetic flux lines 13 from the North pole face 7 of the magnet 4 are directed through an air gap 14 by the pole piece 5, and thence these lines 15 pass through the yoke 3 and through a similar air gap 16, and finally the lines 17 are directed back into the magnet's South pole face 8. The aforementioned air gaps comprise the spaces from the float's soft iron pole pieces 5 and 6 to the soft iron yoke 3, which are occupied by the non-magnetic pipe 2 and the flow stream, which may also be a non-magnetic medium. The dimensions of the pole pieces 5 and 6 are selected such that the cross-sectional areas encountered by the flux lines 13 and 17 are at all times sufficient to ensure that no region of either pole piece is saturated with this magnetic flux.

The flux from the magnetic float 1 is substantially constrained to pass through the yoke 3, and the yoke 3 is designed to be on the verge of saturation by the magnetic flux 15 when the float is in its neutral position shown in FIG. 1C. Each pole piece 5 and 6 extends an axial distance $l_p$, between which there may be a gap of width w. Referring to FIG. 1C, because no region of either pole piece 5 or 6 is saturated, the magnetic flux 14 and 16 will be relatively uniformly distributed over the lengths $l_p$ of both air gaps, and there will be relatively little leakage flux through the adjoining air gap of width w. The central region of the yoke 3 of the width w has a constant radial thickness h, such as at the particular section marked as A—A in FIG. 1C. The dimension h is chosen so that the cross-section of the yoke at A—A will have an area which ensures that this section is on the verge of saturation by the magnetic flux 15. It should be apparent that any radial cross-section of the yoke across the central region w will have the same area and will similarly be on the verge of saturation.

Each outer region of the yoke 3 of width $l_p$ is tapered at an angle α such that its radial cross-sectional area decreases approximately linearly towards the end of the yoke, where it has a radial thickness t. Since an untapered yoke was observed to produce a square-law characteristic signal, and the derivative of this produced signal was observed as being related to the taper of the yoke, an approximately linear taper was found to produce a desirable substantially linear signal. Alternative tapering and/or variation of the radial thickness t may be desirable in specific applications. If the thickness t is infinitesimally small or even zero, because the magnetic flux is relatively uniformly distributed over the lengths $l_p$ of each air gap, any radial cross-section of the yoke from one end to the other will be on the verge of saturation.

Figure 3:
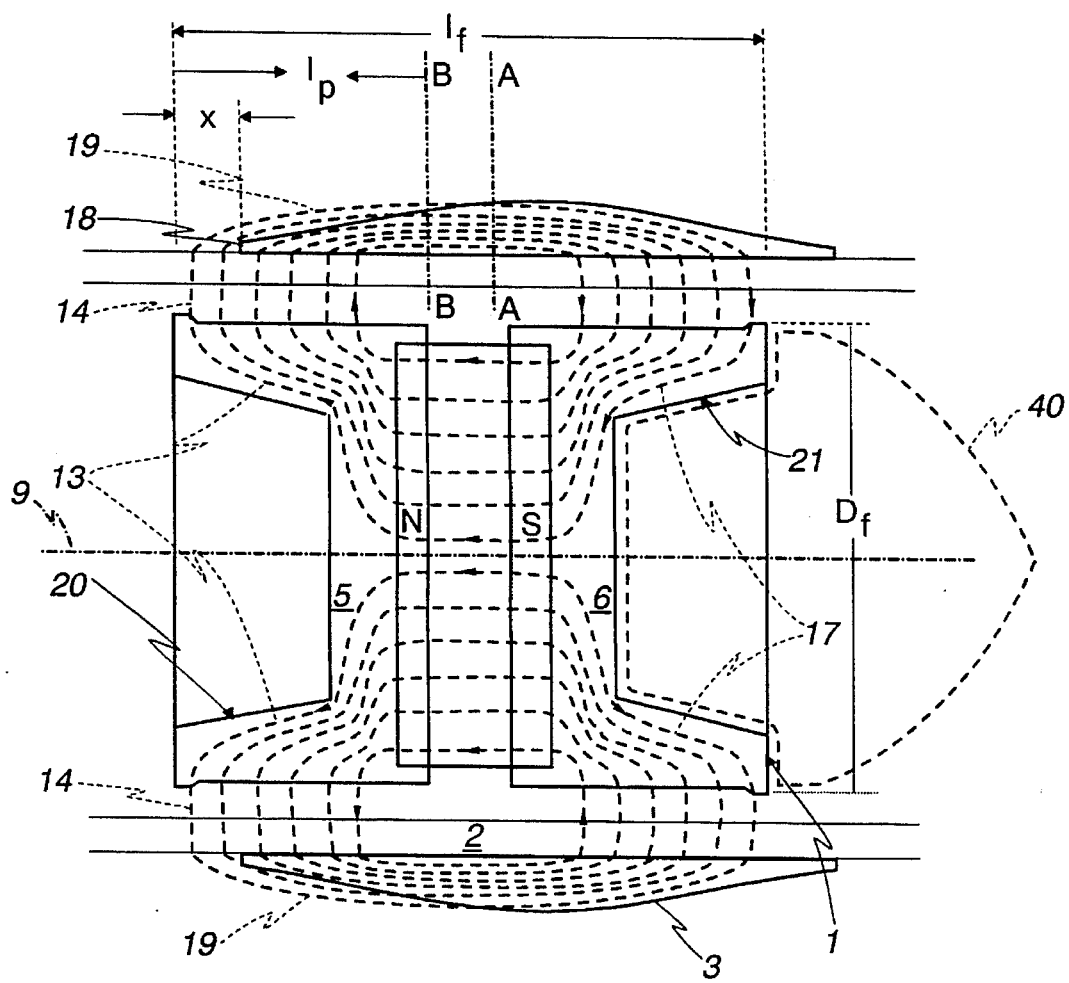
FIG. 3 illustrates the magnetic float in cross-section displaced from its neutral position with flux shown in an air gap path.

Now, consider the magnetic float being linearly displaced from its neutral position by a distance x beyond the yoke end 18 as illustrated in FIG. 3. Because the yoke 3 was on the verge of saturation with the float 1 in its neutral position, the flux density in any radial cross-section of the yoke cannot increase significantly when the float is displaced, the flux density at the section marked as B—B in FIG. 3 which is a distance $(l_p - x)$ from the yoke end 18 cannot have increased significantly, and therefore the magnetic flux 14 will still be relatively uniformly distributed over the entire length $l_p$ of the air gap surrounding the pole piece 5. Because the yoke 3 is effectively saturated from its end 18 to its cross-section B—B, that portion of the flux 14 which resides in the air gap region of width x beyond the yoke end 18 must follow an additional and much longer air gap path 19 and enter the yoke between the cross-sections B—B and A—A as illustrated in FIG. 3, the amount of said flux being the portion $x/l_p$ of the total flux 14 of density $B_{14}$ emitted by the pole piece 5. The increase in the air gap length 19 is due to the yoke being on the verge of saturation when the float was in its neutral position. The energy $E_g$ stored by a uniform flux density $B_g$ in an air gap of area $A_g$ and length $l_g$ may be expressed as:

$$E_g = \frac{A_g l_g B_g^2}{2 \mu_o} \tag{3}$$

When the magnetic float is linearly displaced a distance x, the flux density $B_{19}$ in the additional air gap path 19 increases the field energy $E_g$, this increase according to Equation (3) being proportional to:

$$\left(\frac{B_{19}}{B_{14}}\right)^2 = \left(\frac{x}{l_p}\right)^2 \tag{4}$$

The magnetic force $F_m$ in the direction of x is found by differentiating the field energy in the same direction x:

$$F_m = -\frac{dE_g}{dx} \tag{5}$$

Since the flux density $B_{19}$ represents the only change in field due to the displacement x, and if length of the air gap path 19 is assumed to change very little with x but the area of the air gap path 19 is assumed to be directly proportional to x, then combining Equations (3), (4) and (5) yields the result that the magnetic force $F_m$ directed along the axis 9 is directly proportional to the square of the displacement $-x^2$ of the float 1 from its neutral position. It is apparent from the foregoing that, when the float is displaced a distance $-x$ in the opposite direction from its neutral position, the symmetry of the components of this magnetic reluctance flowmeter provides that the magnetic force $F_m$ is likewise directly proportional to $+x^2$. Consequently, the magnetic force $F_m$ acts in such a direction along the axis 9 as to restore the float to its neutral position, the magnitude of this restoring force being proportional to the square of the displacement from the neutral position.

Referring again to Equation (1), it was noted that a requirement for the measurement of flow rate to be approximately independent of the physical orientation of the magnetic reluctance flowmeter is for the magnetic pressure $P_m$ to be substantially greater than $l_f(\rho_f - \rho)$, and it is clear that this condition is also a requirement for the pressure $P_m$ to be approximately proportional to the square of the flow rate $q^2$. In terms of the magnetic force $F_m$ and the volume $V_f$, this requirement can be expressed as:

$$F_m \gg V_f(\rho_f - \rho) \tag{6}$$

It is apparent that the inequality in Equation (6) can also be enhanced, without altering the length $l_f$ or diameter $D_f$ of the float 1, by reducing the masses of the soft iron pole pieces 5 and 6 in such a manner that the cross-sectional areas encountered by the flux lines 13 and 17 are still sufficient to ensure that no region of either pole piece is saturated by the magnetic flux. This reduction of mass can be effected as shown in FIG. 3 by removing some of the soft iron material by making concave indentations 20 and 21 in the end surfaces of the pole pieces 5 and 6 respectively.

The inequality of Equation (6) may be enhanced by the use of such indentations in the pole pieces and by the use of a high energy "rare earth" permanent magnet. From equation (1), this condition also allows that the magnetic force $F_m$ will be approximately proportional to the square of the flow rate $q^2$, and so as a result of Equations (3), (4) and (5), the displacement of the float 1 from its neutral position x is directly proportional to the flow rate q being measured.

The design of the magnetic circuit of the flowmeter provides that the displacement x is approximately proportional to q. The magnetic circuit thus provides linearity of the relationship between the flow rate q of the liquid or gas and the measurement parameter. To maintain the simplicity of the device, the measuring parameter must be external to the pipe 2, and will therefore be the magnetic flux or flux density surrounding the pipe 2 but not that within the solid yoke 3. Equation (4) shows that the flux density $B_{19}$ in the additional air gap path 19 is one such suitable measurement parameter, being directly proportional to the displacement x such that the flow rate q be approximately linearly proportional to the parameter $B_{19}$ measuring it.

Figure 4:
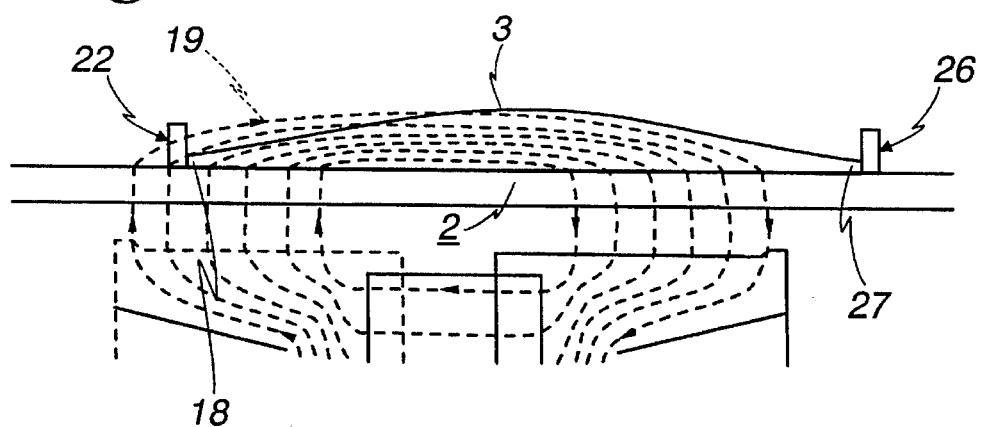
FIG. 4 shows the displaced magnetic float and sensors in the air gap.
Figure 5:
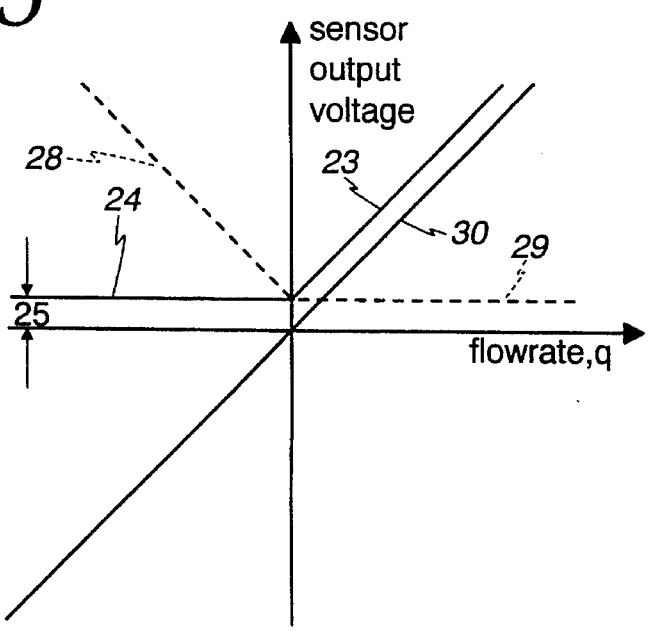
FIG. 5 graphically illustrates linearity of flow rate measurements using the magnetic float and sensor.

The flux density $B_{19}$ can be converted into an electrical signal using any convenient magnetic field sensor that provides a linear relationship between the flux being measured and its output voltage, such as certain types of Hall effect device or magnetoresistor. The magnetic field sensor will provide a maximum response with the plane of its sensing element oriented perpendicular to the direction of the flux being measured, and so an orientation which is both convenient and effective for the measurement of flux density $B_{19}$ in the additional air gap path 19 is with sensor 22 alongside the pipe 2 with the plane of the sensor's element against the yoke end 18 as shown in FIG. 4. When the float is displaced from its neutral position by a distance x beyond the yoke end 18 as shown in FIG. 3, the output voltage from the sensor 22 will be linearly related to the flow rate q as shown by the line 23 in FIG. 5. When the flow stream is reversed such as to displace the float a distance −x in the opposite direction from its neutral position, there is almost no flux in the air gap path 19 and the sensor 22 will yield a constant output voltage shown by the line 24 in FIG. 5. Actually, there may be a very small residual voltage 25 due to unavoidable stray magnetic flux, but this is effectively constant for all flow rates q. Another identical sensor 26 is mounted alongside the pipe 2 at the opposite end of the yoke with the plane of this sensor's element against the yoke end 27 as shown in FIG. 4. It is apparent from the foregoing that the output voltage from the sensor 26 will be related to the flow rate q as shown by the lines 28 and 29 of FIG. 5. It is also apparent that the output voltages of the two sensors 22 and 26 can be added together in a suitable electronic circuit to provide a continuous linear relationship 30 between the resulting voltage and the flow rate q regardless of the direction of the flow stream.

The use of the described float 1 of the described embodiment advantageously provides an output measure of force integrated over the full area of the float 1. By effectively integrating over the float surface, there is no need to provide upstream conditioning for the flowmeter. With reference to FIG. 3, a conical plug 40 shown in dashed lines may also be provided to shape the flow interface between the float 1 and the flow stream.

As described, the magnetic field from the float 1 progressively saturates the yoke 3 as the float moves from its neutral position determined by the linear decrease in the radial cross-sectional area towards each end of the yoke. It is also to be understood that, by shaping the outer surface of the yoke 3 in a predetermined manner such that the decrease in its radial cross-sectional area is not exactly linear, then the relationship between the flow rate q and the voltage resulting from the electronic circuit comprising the sensors 22 and 26 can be adjusted to other suitable predetermined relationships, which may be linear or otherwise.

It should be appreciated that various shapes for the yoke 3 may be employed providing alternate tapering of the outer regions at each end of the yoke 3 such that the radial cross-sectional area decreases towards the end thereof. While the embodiment described herein utilizes symmetric linear tapering to provide linear output signals of the magnetic reluctance flowmeter, convex or concave tapering may be utilized to provide e.g., logarithmic and non-linear signal output, or to enhance sensitivity of the flowmeter at different flow velocities since the thickness and the angle of the taper may be used to vary sensitivity. Of course, the symmetric tapering of the described embodiment provides bidirectional measurements of the same scaling. However, asymmetric tapers could be employed in applications where reverse flow is expected at different rates from the forward flow.

Figure 6:
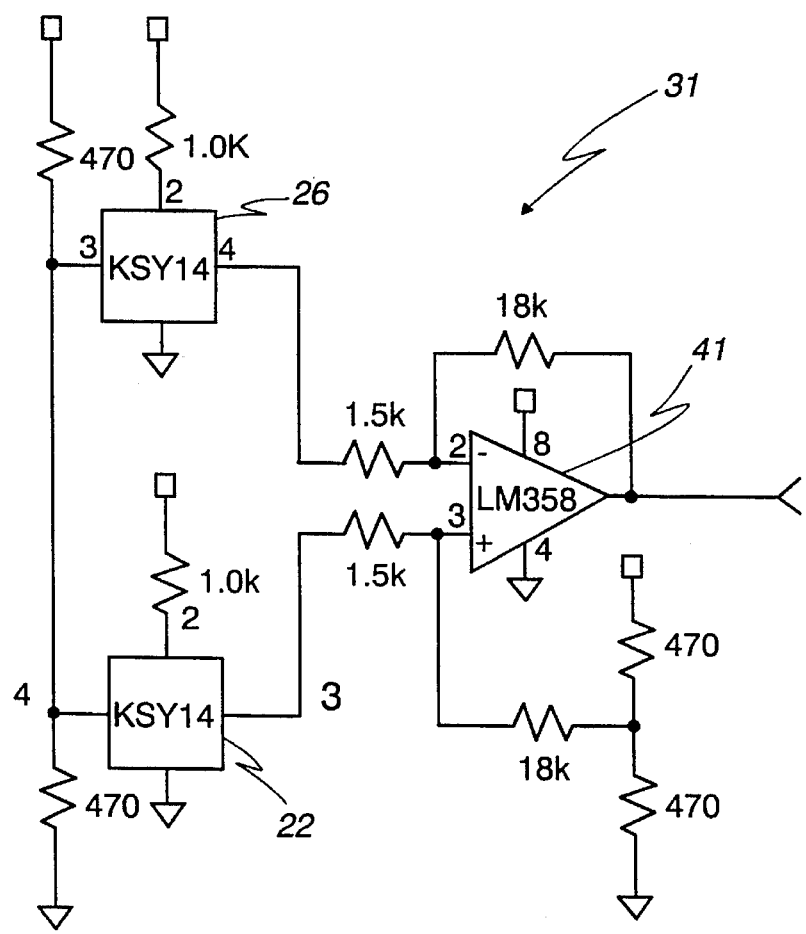
FIG. 6 is a schematic diagram of electronic sensor circuitry having magnetic sensors for carrying on or relative to the soft iron yoke to produce an output signal related to flow velocity.

With reference to FIG. 6, the assembly of magnetic field sensors and associated circuitry 31 is shown as a schematic diagram wherein the embodiment employs the Hall Effect sensors 20 and 22 herein Siemens Hall Effect Sensor Model No. KSY 14 which provide electrical signal input to the differential inputs of an operational amplifier 41, herein LM 358 the output of which may be employed for measurement of axial fluid flow related to the differential signals from magnetic field sensors 22 and 26. The differential amplifier 41 thus provides summing circuitry for sensing the magnetic field emanating from the yoke 3.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A magnetic reluctance flowmeter for measuring axial fluid flow comprising:

a magnetic float within a flow stream displaceable thereby, said float residing coaxially with the fluid flow for generating a magnetic field thereabout;

a ferromagnetic yoke outside the flow stream for substantially constraining the magnetic field to pass directly through said yoke when said float is in a neutral position relative to said yoke;

a magnetic field sensor adjacent said yoke for sensing the magnetic field emanating from said yoke when said float is displaced from the neutral position allowing the magnetic field to saturate a region of said yoke; and an electronic circuit connected to said sensor for producing an output signal which is related to the fluid flow displacing said float.

2. A magnetic reluctance flowmeter in accordance with claim 1 wherein said float comprises a disk-shaped permanent magnet of rare earth grade material.

3. A magnetic reluctance flowmeter in accordance with claim 2 wherein said float comprises pole pieces at the ends thereof with said disk-shaped permanent magnet positioned therebetween.

4. A magnetic reluctance flowmeter in accordance with claim 3 wherein said float is plated with a corrosion resistant plating to provide protection to the disk-shaped permanent magnet and the end pieces.

5. A magnetic reluctance flowmeter in accordance with claim 4 wherein said corrosion resistant plating comprises nickel plating.

6. A magnetic reluctance flowmeter in accordance with claim 3 wherein said float is encased with a corrosion resistant material to provide protection to the disk-shaped permanent magnet and the end pieces.

7. A magnetic reluctance flowmeter in accordance with claim 6 wherein said corrosion resistant material encasing said float comprises means for positioning said float within said flow stream.

8. A magnetic reluctance flowmeter in accordance with claim 6 wherein said corrosion resistant material comprises epoxy.

9. A magnetic reluctance flowmeter in accordance with claim 3 wherein said float is coated with a corrosion resistant coating to provide protection to the disk-shaped permanent magnet and the end pieces.

10. A magnetic reluctance flowmeter in accordance with claim 9 wherein said float comprises a conical plug on at least one of said pole pieces to shape the flow interface between said float and the flow stream.

11. A magnetic reluctance flowmeter in accordance with claim 9 wherein said corrosion resistant coating comprises TEFLON™.

12. A magnetic reluctance flowmeter in accordance with claim 9 wherein said yoke is a cylindrical soft iron yoke positioned coaxially about said float and the fluid flow, said yoke comprising a central region and an outer region at each end of said yoke tapered such that the radial cross-sectional area of said yoke decreases towards the end thereof.

13. A magnetic reluctance flowmeter in accordance with claim 12 wherein each outer region of said yoke tapers approximately linearly towards the end thereof allowing said electronic circuit to produce the output signal as being linearly related to the fluid flow displacing said float.

14. A magnetic reluctance flowmeter in accordance with claim 12 wherein one outer region of said yoke is tapered differently from that of the other outer region of said electronic circuit to produce correspondingly different output signals related to the fluid flow displacing said float.

15. A magnetic reluctance flowmeter in accordance with claim 13 wherein said sensor comprises a Hall Effect device.

16. A magnetic reluctance flowmeter in accordance with claim 13 wherein said sensor comprises a magnetoresistor.

17. A magnetic reluctance flowmeter in accordance with claim 15 wherein said circuit comprises a summing amplifier for determining the displacement of said float from the neutral position.

18. A magnetic reluctance flowmeter in accordance with claim 17 wherein said sensor comprises a pair of Hall Effect devices coupled to said summing amplifier allowing said circuit to determine forward and reverse displacement of said float.

19. A magnetic reluctance flowmeter in accordance with claim 18 wherein one of the Hall Effect devices of said pair is positioned at one outer region of said yoke and the other Hall Effect device of said pair is positioned at the other outer region of said yoke.

20. A magnetic reluctance flowmeter in accordance with claim 19 further comprising a flow pipe upon which said yoke is attached and through which the flow stream is directed, said float being supported within said flow pipe, said flow pipe comprising non-magnetic material.

21. A magnetic reluctance flowmeter in accordance with claim 20 wherein said flow pipe comprises glass.

22. A magnetic reluctance flowmeter in accordance with claim 20 wherein said flow pipe comprises aluminum.

23. A magnetic reluctance flowmeter in accordance with claim 21 wherein said flow pipe comprises a generally tubular interior surface comprising at least three flat regions thereon.

24. A magnetic reluctance flowmeter in accordance with claim 23 wherein said pole pieces comprise end-bearing ridges thereon facilitating minimal contact between said float and said flow pipe.

25. A method for measuring axial fluid flow comprising the steps of:

providing a magnetic float within a flow stream coaxial with the fluid flow for generating a magnetic field thereabout;

surrounding the flow stream and the magnetic float therein with a ferromagnetic yoke outside the flow stream substantially constraining the magnetic field to pass directly therethrough when the float is in a neutral position relative to the yoke;

allowing the float to be displaced from the neutral position with the flow stream allowing the magnetic field to saturate a region of the yoke;

sensing the magnetic field adjacent the yoke to determine the magnetic field emanating from the yoke when the float is displaced from the neutral position allowing the magnetic field to saturate the region of the yoke; and producing, responsive to said sensing step, an output signal which is related to the fluid flow of the flow stream displacing said float.

26. A magnetic flow transducer for measuring axial fluid flow comprising:

a magnetic float within a flow stream displaceable thereby, said float residing coaxially with the fluid flow for generating a magnetic field thereabout;

a ferromagnetic yoke outside the flow stream for substantially constraining the magnetic field to pass directly through said yoke when said float is in a neutral position relative to said yoke; and a magnetic field sensor adjacent said yoke for determining the amount of magnetic field emanating from said yoke when said float is displaced from the neutral position allowing the magnetic field to saturate a region of said yoke.

* * * * *